United States Patent Office 3,728,307
Patented Apr. 17, 1973

3,728,307
METHOD OF PREPARING HARDENABLE PLASTICS COMPRISING CONDENSING MIXED ARYL BORATES WITH HCHO
Franz Josef Huster, Drachenfelsstr. 5,
Troisdorf, Germany
No Drawing. Continuation-in-part of applications Ser. No. 519,805, Nov. 2, 1965, and Ser. No. 852,151, Aug. 13, 1969, both now abandoned. This application Oct. 27, 1971, Ser. No. 192,934
Claims priority, application Germany, Nov. 3, 1964, D 45,766
Int. Cl. C08g 5/06, 33/18
U.S. Cl. 260—51 R
3 Claims

ABSTRACT OF THE DISCLOSURE

Novel mixed aryl borates of the general formula $BO_x(OAr)_y$, wherein Ar is an aryl radical, $x$ is greater than 1 but less than 1.5 and $y$ is greater than 0 and less than 1, which mixture contains branched chain aryl borates of the formula:

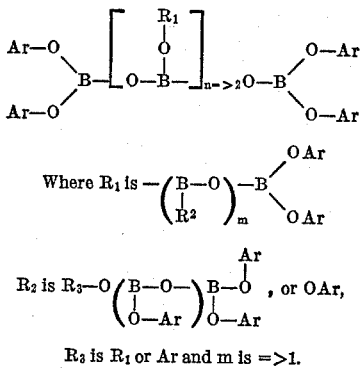

which mixed aryl borates are made by reacting a phenolic compound with boric acid or boric oxide with an excess of boron at elevated temperatures and for extended periods of time sufficient to condense the boron compound and the phenolic compound and cause water as well as phenolic compound to be condensed out of the reaction and removed therefrom. These mixed aryl borates are reactable to produce a preproduct which is then reacted with trioxane and, if desired, a solid formaldehyde yielding materials to form thermosetting resins of the phenolaldehyde type containing boron thereon.

---

This application is a continuation-in-part of application Serial No. 519,805, filed Nov. 2, 1965, now abandoned and 852,151 filed Aug. 13, 1969 (as a streamlined continuation of said application Ser. No. 519,805), now also abandoned.

This invention relates to boron-containing hardenable plastics. It more particularly relates to condensation products of aryl borates and formaldehydes.

It is well known that aryl borates can be reacted with formaldehyde to produce polymeric condensates which can be reacted with formaldehyde to produce polymeric condensates which can be converted into thermosetting resins by techniques similar to those which have been extensively used in connection with the production of phenol formaldehyde resins. The aryl borates are generally monocyclic and more particularly are phenol or cresol derivatives.

The formaldehyde aryl borate condensation products are hardenable into thermosetting resins. The aryl borates of the empirical formula set forth above are mixtures containing at least one branched-chain aryl borate having the formula:

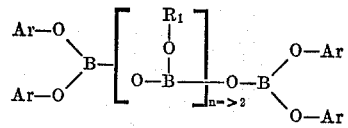

wherein $n$ is greater than two and $R_1$ has the above meaning.

The aryl borate formaldehyde condensation products made in the past have found utility as molding and coating compositions having excellent high temperature properties. Such resins can have incorporated into them fillers such as asbestos, mica, etc., dyes, pigments, carbon black and other similar materials.

It is known that the degree of thermal stability possessed by an aryl borate-formaldehyde condensation resin is a function of the ratio of aryl radicals to boron in the molecule. The thermal stability of such materials is greater as the ratio of boron to aryl radical increases. Unfortunately, the melt viscosity of aryl borates also increases as the ratio of boron to aryl radical increases. This property makes it extremely difficult, if not impossible, to take advantage of the high thermal resistance of high boron to aryl radical ratio molecules since, as the melt viscosity increases, processing difficulties are encountered, particularly disadvantageous in industrial applications.

It is therefore an object of this invention to provide means of attaining high boron to aryl radical ratios in aryl borate formaldehyde condensation resins while avoiding the processing problems heretofore encountered in such systems.

It is another object of this invention to provide a novel method of manufacturing aryl borate formaldehyde condensates.

Other and additional objects of this invention will become aparent from a consideration of this specification in its entirety as well as the claims appended hereto.

In accord with and fulfilling these objects, this invention resides in one of its aspects in reacting an aryl borate corresponding to the formula $BO_x(OAr)_y$ or corresponding to the sum formula $B_aO_{ax}(OAr)_{ay}$, where Ar is an aryl radical, $x$ is greater than 1 but less than 1.5, $y$ is greater than 0 but less than 1, $2x+y=3$, and $a$ represents the number of boron moieties joined together in the aryl borate molecule, with trioxane and, if desired a formaldehyde supplying substance which is solid at room temperature.

The aryl borates which are used in this invention are prepared by reaction of boric oxide or boric acid with the desired phenol or cresol. The reactants are admixed in such a mol ratio as to provide excess boron reactant. It should be understood that, since this preparation involves a condensation and since water is removed from the system during the reaction, enough phenol must be employed to satisfy not only the reaction, but also the water as azeotrope.

For the preparation of the aryl borates a mixture of phenol and boric acid is firstly heated up to 140° C. At this temperature the reaction between the components begins. During this reaction water and phenol distil off, whereby the quantity of phenol depends on the conditions of the reaction, e.g. velocity of heating up or the length of the distillation column. The temperature during the reaction shall not exceed 300° C.

There are different ways of operating to achieve the desired molar ratio between boron and phenol in the developed aryl borates: either, in the initial mixture of phenol and boric oxide, these two components are already present in the desired ratio and during the distillation (up from 140° C.) the temperature is only slowly increased, in this manner, that nearly the total quantity of the present phenol can react with the boric oxide. Otherwise, in the initial mixture a molar excess of phenol is present and the heating up of the reaction mixture up from 140° C. takes place quickly just up to 300° C. When operating in this way larger quantities of non-reacted phenol are distilled off.

In both cases the distillation is continued as long as in the distillate such a quantity of phenol is gathered that in the residue (which is the aryl borate) remains such a quantity of phenol corresponding to a value $y<1$ in the general formula $BO_x(OAr)_y$ of the aryl borate.

It is also possible to determine the desired boron proportion in the aryl borate by a testing method. In this case—during the distillation—specimen are taken from the reaction mixture out of the distillation apparatus, which slowly solidify. The solidifying temperature is determined. As soon as a specimen solidifies at about 100° C. or a higher temperature. The index $y$ in the general formula $BO_x(OAr)_y$ of the aryl borate is less than 1.

In the production of mixed aryl borate reactants of this invention, it is preferred that the condensation be carried out at a temperature of about 140° to 300° C., whereby during the condensation the temperature increases up to 300° C. for a time varying from about 5 to 50 hours in order to produce the desired mixed aryl borate.

In the condensation reaction according to this invention, the aryl borates must contain at least two positions in the phenol which are reactive with formaldehyde. More than two formaldehyde reactive sites per phenol are also operable in this invention. The invention is carried out by reacting the desired aryl borate with about $\frac{1}{10}$ to $\frac{1}{20}$ of the total amount of trioxane or with such quantity of solid formaldehyde supplying substance as to provide the equivalent of this quantity of formaldehyde. This first step is carried out by first dissolving the aryl borate in a portion of the formaldehyde (in the form of trioxane), needed for the condensation. The components of this solution react and the reaction product has a much lower melting point, i.e., often about room temperature, than does the aryl borate moiety per se. Then the other part of the formaldehyde is added in form of trioxane and/or solid formaldehyde yielding substances. This condensation product is then pre-hardened by heating to a temperature of about 80 to 100° C. to form a hardened product.

The same product can be produced in a single step, by starting the reaction at low temperature, e.g., about 20 to 50° C., and then slowly raising the reaction temperature to about 100° C. The rate of reaction temperature rise is controlled according to the batch size and also according to the reactivity of the aryl borate.

This condensation can be carried out in the absence of any catalyst or it can be aided by the presence of such catalyst as hexamethylene tetramine, Lewis acids, boron oxide, phosphorous oxide, phosphoric acids, p-toluene sulfonic acids, and the like.

While this invention is particularly well suited to being carried out in the absence of solvents, their use, of course, is possible where desired.

The following examples are given as illustrative of the invention. It is not intended, however, that they be considered as a limitation thereof.

EXAMPLE 1

2.2 g. trioxane were added with agitation at about 100° C. to a melt of 160 g. of phenyl borate $BO_{1.05}(OC_6H_5)_{0.9}$, made by reacting phenol and boric oxide in a mol ratio of 1.5 phenol to 1 mol boric acid up to a temperature of 280° C. for 15 hours. The reaction mixture was then cooled to 50° C. and the remaining quantity of trioxane (42.2 g.) was added, also with agitation, within the course of 20 minutes. Thereupon the temperature was slowly increased to 80 to 85° C. and the reaction allowed to continue until the desired degree of condensation had been obtained.

EXAMPLE 2

160 g. of the composition described in Example 1 were reacted, under the conditions set forth in said example, except that 50% of the trioxane was replaced by paraformaldehyde.

The resins prepared in accordance with the invention had in hardened condition excellent resistance to high temperatures. A molding composition prepared in the known manner from asbestos and the resin prepared in accordance with the invention after storage for 100 hours at 260° C. did not show any decrease in its mechanical properties but even rather an increase. After storage for 50 hours at 340° C., the bending strength and impact strength of the hardened boron-resin/asbestos molding compositions were even greater than the normal values of the pheneol resin/asbestos molding composition which had not been stored in the hot. In addition to this, moldings could be heated for several hours up to 400° C. without blistering or cracks resulting.

What is claimed is:

1. A thermosetting resin which is the reaction product of trioxane and a mixed aryl borate of the sum of formula $BO_x(OAr)_y$, wherein Ar is at least one member selected from the group consisting of phenyl and alkyl substituted phenyl radicals, $x$ is greater than 1 but less than 1.5 and $y$ is greater than 0 and less than 1, and $2x+y=3$, which aryl borates contain at least one branched or cross-linked chain aryl borate of the formula:

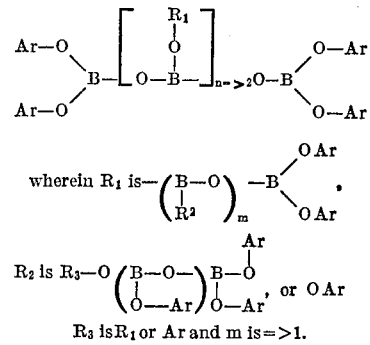

$R_3$ is $R_1$ or Ar and m is $=>1$.

2. A thermosetting resin as claimed in claim 1, wherein, in said mixed aryl borate, $x$ is 1.05, said Ar is phenyl and $y$ is 0.9.

3. A thermosetting resin as claimed in claim 1, wherein the trioxane is partly substituted by other formaldehyde-yielding substances.

References Cited

UNITED STATES PATENTS 3,631,151  12/1971  Huster _____ 260—51

FOREIGN PATENTS 22,513  9/1969  Japan _____ 290—53 R

HOWARD F. SCHAIN, Primary Examiner

U.S. Cl. X.R.

260—38.53 R, 57 A, 57 R